United States Patent [19]

Bennett

[11] 3,927,691
[45] Dec. 23, 1975

[54] FLUID CONDUCTOR

[76] Inventor: David F. Bennett, 1100 Fleetwood Ave., Daytona Beach, Fla. 32014

[22] Filed: Oct. 10, 1974

[21] Appl. No.: 513,571

[52] U.S. Cl. ............... 137/615; 138/120; 210/525; 210/527; 248/292
[51] Int. Cl.² ........................................ B65G 53/40
[58] Field of Search ..... 137/615; 138/120; 210/524, 210/525, 527; 248/292, 364

[56] References Cited
UNITED STATES PATENTS

| | | | |
|---|---|---|---|
| 1,478,925 | 12/1923 | Steed | 137/615 |
| 2,250,227 | 7/1941 | Kiel | 137/615 |
| 2,305,929 | 12/1942 | Lund et al. | 210/527 |
| 2,365,821 | 12/1944 | Horn | 248/364 |
| 2,739,778 | 3/1956 | Krone et al. | 248/292 |
| 3,013,665 | 12/1961 | Schmidt et al. | 210/525 |
| 3,073,343 | 1/1963 | Mowell et al. | 137/615 |
| 3,236,259 | 2/1966 | Ashton | 137/615 |
| 3,489,174 | 1/1970 | Cooley, Jr. | 137/615 |
| 3,526,591 | 9/1970 | Hampton | 210/525 |
| 3,651,832 | 3/1972 | Meyer | 137/615 |

Primary Examiner—William R. Cline
Assistant Examiner—H. Jay Spiegel
Attorney, Agent, or Firm—John N. Randolph

[57] ABSTRACT

A conductor for fluids, usually under pressure, composed of rigid conduit sections which are rotatively connected to one another to enable the distance between an inlet end and an outlet end of the conduit to vary and to permit one end to be attached to and movable with a reciprocally moving action. A counterweight means is provided to partially support the weight of certain of the conduit sections when said sections move from substantially upright toward horizontal positions. A safety interlock prevents the swingably movable conduit sections from swinging away from upright positions while said end of the conduit is in approximately an intermediate position, in substantially the same vertical plane as said swingably movable conduit sections, to counteract any excess force which might tend to force the swingably movable sections out of upright positions.

7 Claims, 5 Drawing Figures

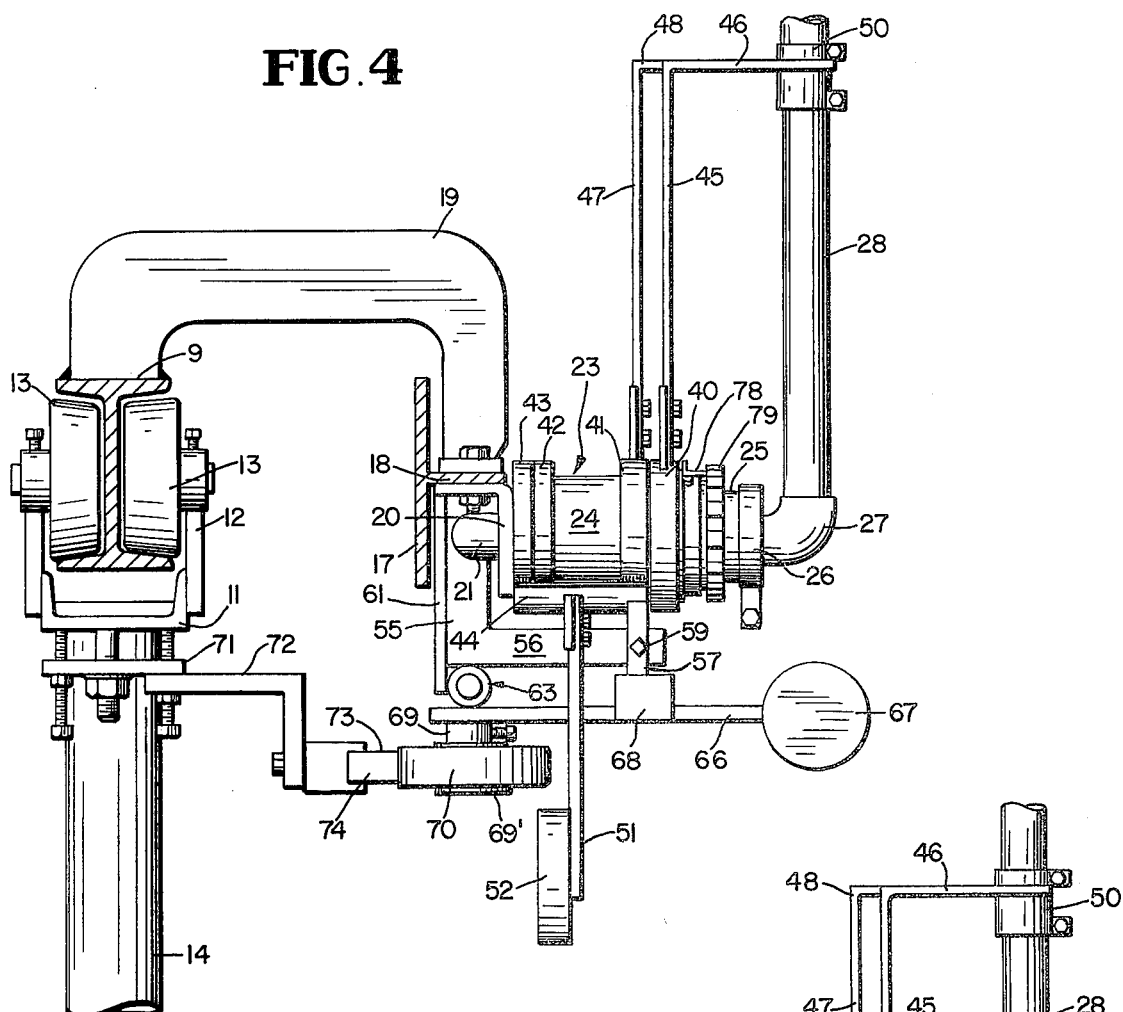

3,927,691

FLUID CONDUCTOR

SUMMARY

It is a primary object of the present invention to provide a fluid conductor composed of rigid rotatively connected conduit sections for supplying a fluid, such as compressed air, to a reciprocally moving part, such as an air lift column of an apparatus for cleaning sludge from the bottom of tanks or other receptacles.

Another object of the invention is to provide a fluid conductor capable of replacing the hose, normally used in supplying air under pressure to an outlet point which is in motion, and which hose frequently forms an obstruction to a structure into which said outlet discharges.

A further object of the invention is to provide such a movable conduit having a unique counterweight system for partially supporting the weight of certain sections of the conduit as such sections move downwardly from substantially upright positions toward horizontal positions.

Still a further object of the invention is to provide such a conduit having a safety lock for temporarily locking the swingably movable conduit sections while in their substantially upright positions, when one of the said conduit sections is in substantially the same vertical plane as the other swingable movable section, and for automatically releasing said upright sections for swinging movement, as the conduits move away from said vertical plane.

Various other objects and advantages of the invention will hereinafter become more fully apparent from the following description of the drawings illustrating a presently preferred embodiment thereof, and wherein:

BRIEF DESCRIPTION OF THE DRAWINGS

FIG. 4 is a side elevational view, on a somewhat reduced scale, of the parts as seen in FIG. 2 and including an additional structure of the invention shown partially in elevation and partially in cross section, and FIG. 5 is a view similar to FIG. 4 but illustrating an alternate position of certain of the parts.

DESCRIPTION OF THE PREFERRED EMBODIMENT

Figure 1:
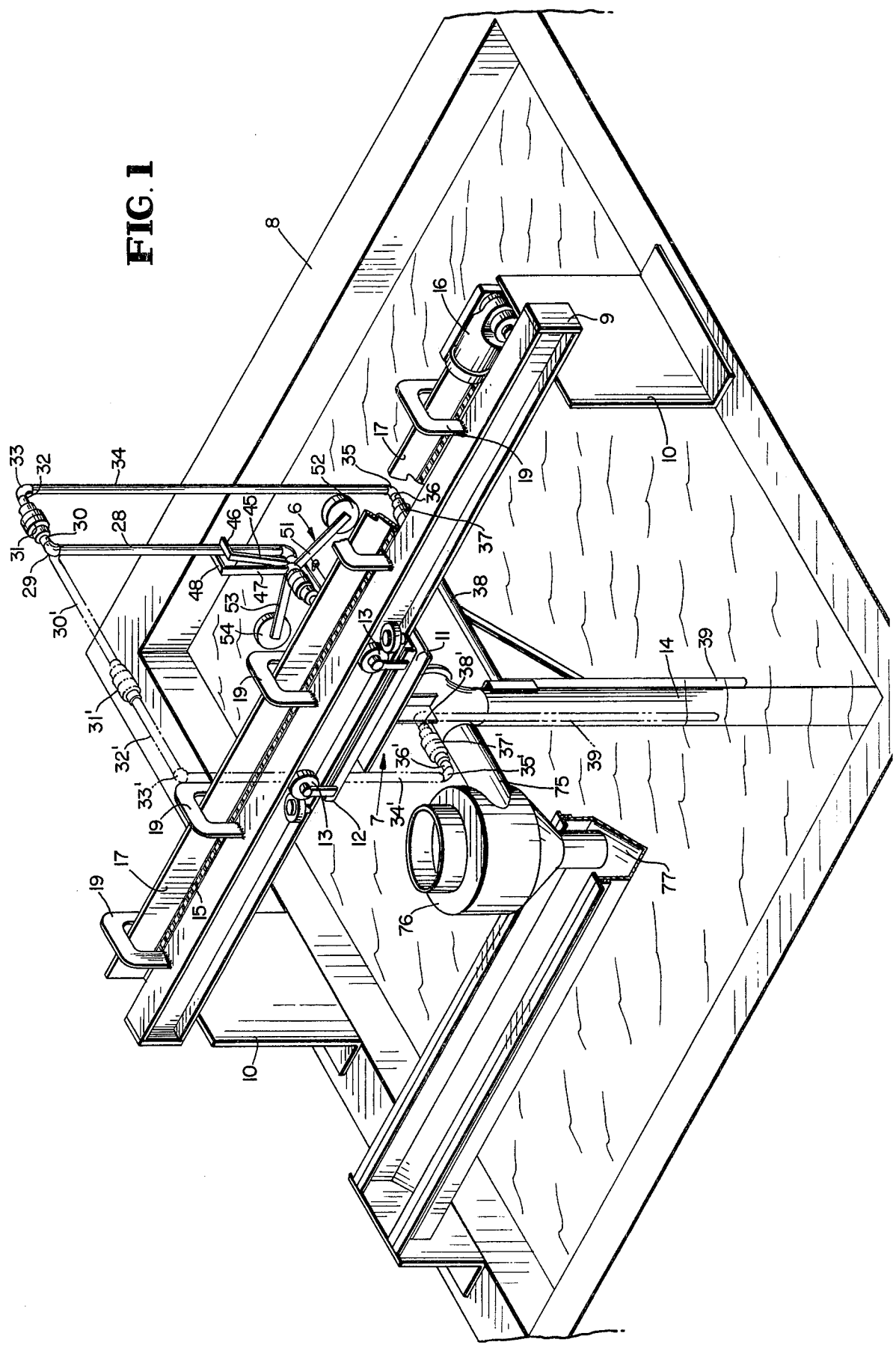
FIG. 1 is a perspective view of the inverted mechanical fluid conductor shown in conjunction with a sludge pumping apparatus, partially broken away.

Referring more specifically to the drawings, the fluid conductor in its entirety and comprising the invention is designated generally 6 and is shown in conjunction with a sludge pumping apparatus designated generally 7 and which is mounted on a liquid containing tank or receptacle 8. A rail 9 of the apparatus 7 is supported on uprights 10 which are fixed to and rise from end walls of the tank 8. A carriage 11 is suspended beneath the rail 9 by hangers 12 which are supported by wheels 13 which engage on the bottom flange of the rail 9 which is in the form of an I-beam, as illustrated in FIGS. 4 and 5. An airlift column 14 is suspended from the carriage 11 and opens adjacent the bottom of the tank 8 for removing sludge from the tank bottom. The carriage 11 and column 14 are reciprocated between end walls of the tank 8, from which the uprights 10 rise, by endless chain 15 driven by a motor 16. The parts of the apparatus 7, as illustrated in the drawings, substantially correspond to and function in the same manner as the sludge removing apparatus as disclosed in U.S. Pat. No. 3,132,773.

The fluid conductor 6 includes a beam 17 having a horizontal flange 18. The beam 17 is supported to one side of and substantially parallel to the rail 9 by a plurality of arched-shape support members 19 having corresponding ends secured to the upper side of the top flange of the rail 9 and opposite ends secured to the upper side of the flange 18. The flange 18 is disposed on the side of the beam 17 disposed remote from the rail 9. A bracket 20 is secured to and depends from the flange 18. The terminal end 21 of a rigid conduit 22 extends outwardly through and is supported by the bracket 20 and opens into a swivel 23, which is also supported by said bracket 20. The swivel 23 includes a stationary cylinder 24 constituting the outer section thereof and an inner section 25 in the form of a sleeve which rotatably fits in the cylinder 24 and which protrudes from the end thereof, disposed remote from the bracket 20. A cap 26 is secured on said protruding end of the sleeve 25 and has an elbow 27 projecting therefrom and which communicates with the bore of the sleeve 25.

A rigid conduit section 28 is secured to and communicates with the elbow 27 and normally extends upwardly therefrom with its axis disposed at a right angle to the axis of the sleeve 25. Conduit section 28 terminates at its other end in an outturned elbow 29 to which is connected a short length of pipe 30 which opens into one end of a swivel 31. A short length of pipe 32 leads from the other end of the swivel 31 to one end of an elbow 33. The other downturned end of the elbow 33 is connected to one end of a rigid conduit section 34 which extends downwardly therefrom to below the level of the rail 9, chain 15 and beam 17 and which terminates in an elbow 35. A short length of pipe 36 leads from the other inturned end of the elbow 35 to one end of a swivel 37. A rigid conduit section 38 leads from the other end of the swivel 37, beneath the parts 9, 15 and 17 and joins with the upper end of a rigid conduit section 39 which is supported by and extends downwardly along the airlift column 14. The lower end of the conduit section 39, not shown, discharges into the airlift column 14 near its open lower inlet end.

As illustrated in dotted lines of FIG. 1, the elbow 29 may be turned in the opposite direction and connected to one end of a longer pipe 30' which discharges into one end of a swivel 31' and a pipe 32' leads from the other end of the swivel 31' over the beam 17 and rail 9 to an elbow 33'. A pipe 34' connects with and extends downwardly from the elbow 33' on the side of the rail 9 disposed remote from the beam 17. The pipe 34' is spaced from said rail 8 and the carriage 11 and connects at its lower end with an elbow 35'. A short pipe 36' leads from an inturned end of the elbow 35' and discharges into one end of a swivel 37'. A pipe 38' leads from the other end of the swivel 37' and connects with the upper end of a pipe 39' which is supported by and extends downwardly along the airlift column 14, and which has a lower end, not shown, discharging into the lower portion of said airlift column. It will be apparent that the dotted line illustration of FIG. 1 represents merely an alternative arrangement of the conduit sections and two of the swivels and that in both illustrations the axes of all of the swivels are disposed parallel to one another.

Assuming that the other end of the conduit 22 is connected to a source of air under pressure, air will be supplied to the swivel 23 and then to the conduit section 28, swivel 31, conduit section 34, swivel 37 and conduit sections 38 and 39 and then to the lower end of the airlift column 14; or alternatively through the conduit sections and swivels shown in dotted lines in FIG. 1 to said airlift column 14. While the airlift column 14 is moving back and forth in the tank 8 with the carriage 11, the fluid conductor 6 although composed of rigid conduit sections only, will have its outlet end 39 or 39' traveling with the column 14, due to the fact that as the column 14 moves from its intermediate position, as illustrated in FIG. 1, the conduits 28 and 34 will swing from upright positions with the conduit 28 pivoting about the axis of the swivel 23 and the conduit 34 pivoting about the axis of the swivel 37, while adjacent ends of said conduits turn relative to one another about the axis of the swivel 31. Thus, the conduit sections 28 and 34 swing from nearly upright positions downwardly toward nearly horizongal positions as the column 14 moves from an intermediate position as seen in FIG. 1 to an extreme position adjacent one end of the tank 8, after which said conduit sections 28 and 34 move back to upright positions and then swing in the opposite direction toward nearly horizontal positions, as the column 14 approaches the other extremity of its movement. The aforementioned description would apply in the same manner to the conduit sections and swivels shown in dotted lines in FIG. 1. The aforedescribed fluid conductor 6 thus provides a conduit system composed of rigid sections only and yet which has one end capable of traveling back and forth with a reciprocally moving airlift column.

Figure 2:
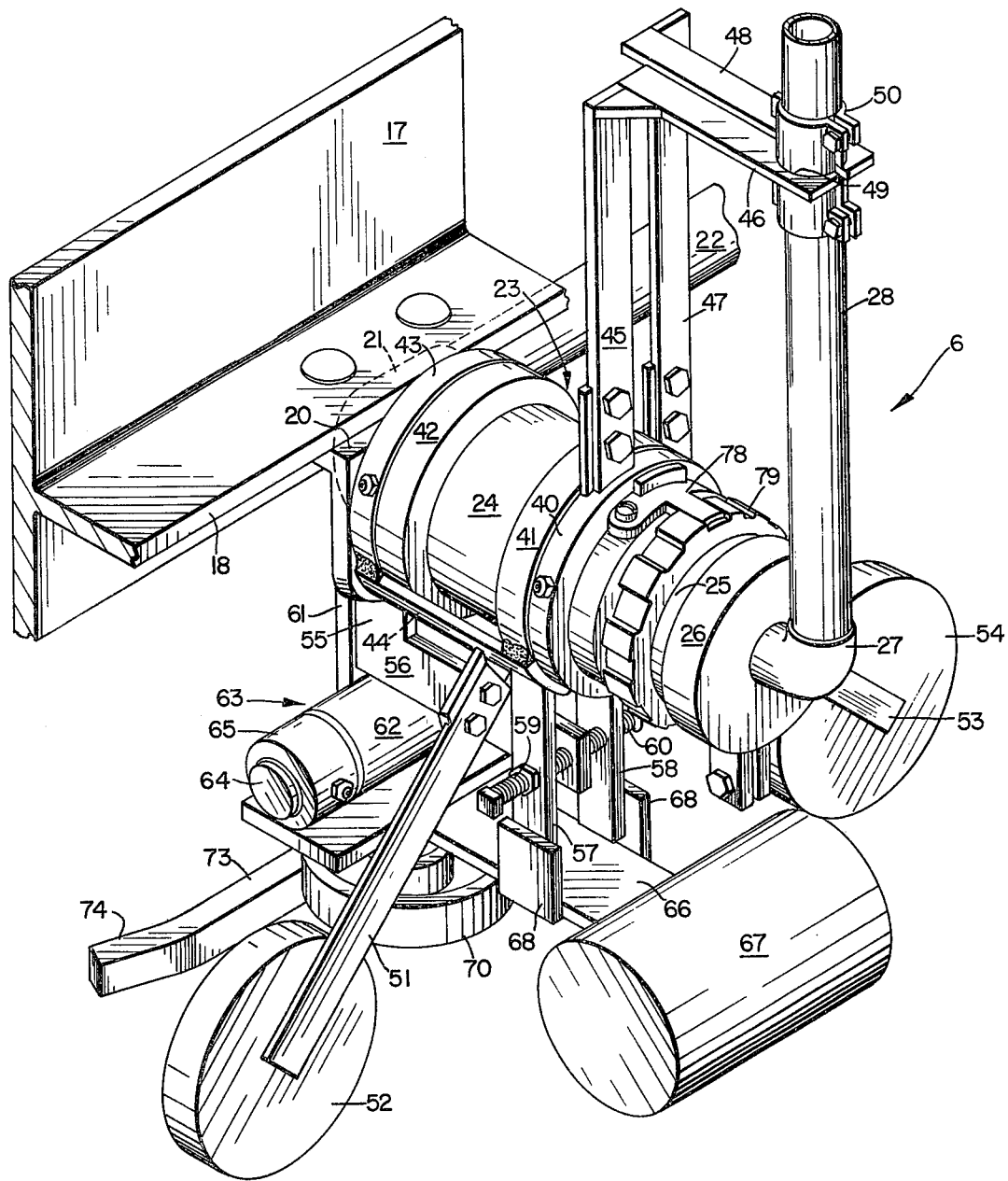
FIG. 2 is an enlarged perspective view of a portion of the inverted mechanical fluid conductor.

The fluid conductor 6 also includes a novel counterweight system, best illustrated in FIG. 2, which includes rings 40, 41, 42 and 43 which are rotatably mounted on the cylinder 24. Rings 40, 41 are located adjacent the outer portion of the cylinder 24 and rings 42, 43 nearer the inner end thereof, with the ring 43 disposed against or substantially against the bracket 20. A saddle 44 is secured to and connects the rings 41 and 43, and a corresponding saddle, not shown, located on the far side of the swivel 23, as seen in FIG. 2, connects the rings 40 and 42 in the same manner.

A post 47 is secured to and normally extends upwardly from the ring 41 and has an outwardly extending arm 48 at its upper end which extends outwardly therefrom toward the conduit section 28. A similar post 45 is secured to and extends upwardly from the ring 40 and has an outwardly extending arm 46 at its upper end. The arms 46 and 48 have opposed inwardly opening notches 49 which straddle the conduit section 28 and which normally embrace a collar 50 which is secured to said conduit section.

An arm 51 is secured to and extends outwardly and downwardly from the saddle 44 and has a counterweight 52 secured to a lower end thereof. A corresponding arm 53 extends outwardly and downwardly from the other saddle and supports a counterweight 54 at its outer end.

The upper end of one leg of an angular bar 55 is secured to the bracket 20. The other leg 56 extends outwardly and is disposed beneath the swivel 23 and in the same vertical plane as the axis of said swivel. A bar 57 is secured to and depends from the saddle 44 and a bar 58 is similarly secured to and depends from the other concealed saddle. The bars 57 and 58 straddle the bar end or abutment 56 and said bars 57 and 58 have screws 59 and 60 threaded inwardly therethrough and which have inner ends which abut opposite sides of the abutment 56, when the conduit section 28 is in an upright or substantially upright position. The screws 59 and 60 are adjustably mounted in the bars 57 and 58.

A hanger 61 is secured to and depends from the bracket 20 and bar 55, and has a barrel 62 of a hinge 63 secured to its lower end and disposed beneath the abutment 56. A hinge pin 64 extends through the barrel 62 and through barrels 65 which pivot on the pin 64, beyond the end of the barrel 62, and only one of which barrels 65 is illustrated. The barrels 65 are secured to a lever arm 66 which extends outwardly from the hanger 61 and which supports a weight 67 at its free end. Ears 68 are secured to and extend upwardly from side edges of the arm 66 and straddle the bars 57 and 58, as seen in FIG. 2, when the notches 49 are embracing the column 50 and the lever arm 66 is in its elevated position of FIG. 2.

Referring to FIGS. 4 and 5, a boss 69 is supported by and depends from the lever arm 66, beneath the hinge 63, and provides a socket for a flanged axle 69', thus forming a bearing support for a wheel 70. As seen in FIG. 4, mounting plates 71 depend from the ends of the carriage 11 and support angle brackets 72 which in turn support a rail 73 having ends 74 forming cam portions which are curved in a direction toward the plane of the rail 9 and column 14.

Figure 3:
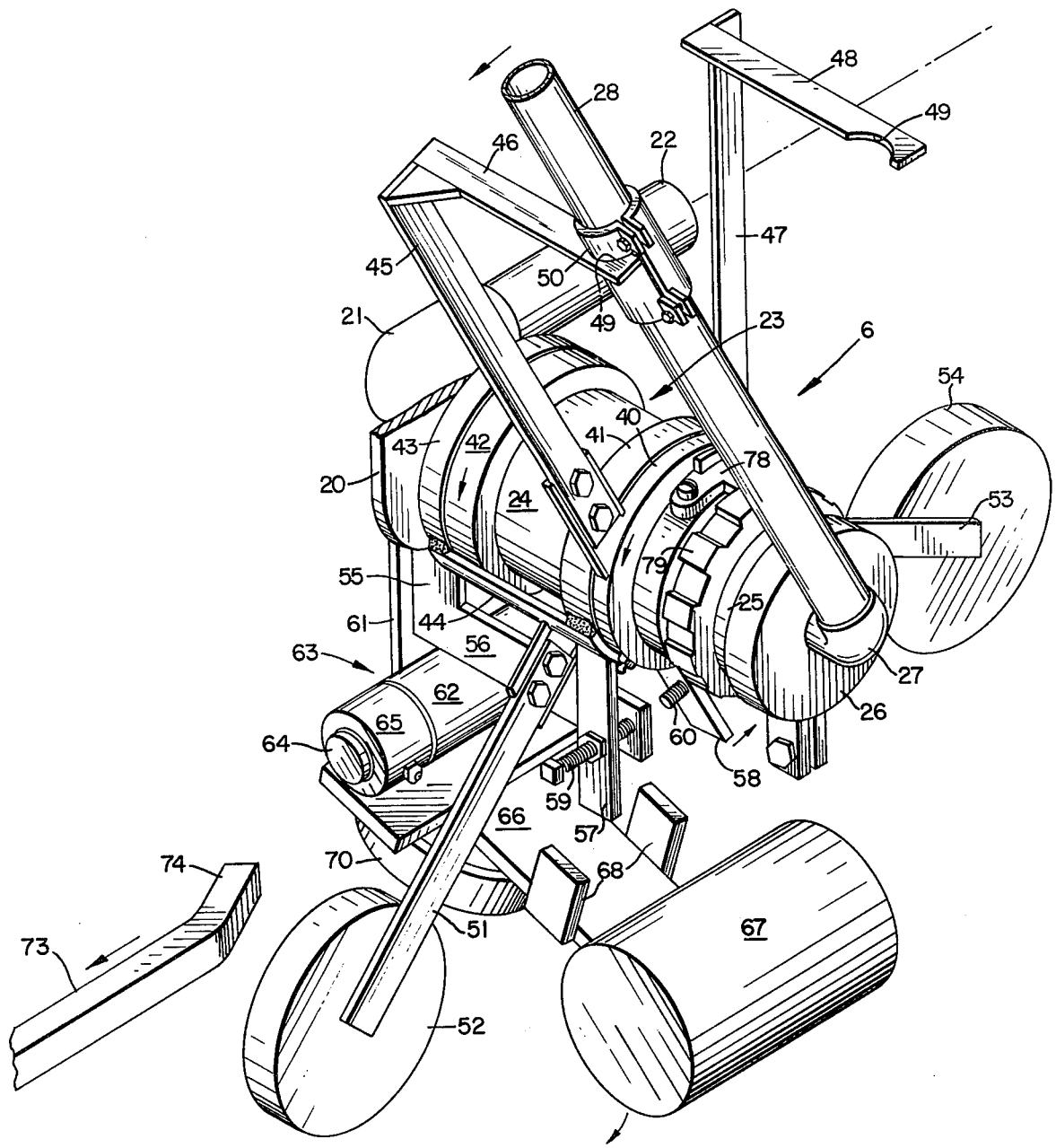
FIG. 3 is a view similar to FIG. 2 but illustrating a different position of certain of the parts.

As the carriage 11 approaches its intermediate position of FIGS. 1, 2 and 4, and at which time the notches 49 will have embraced the collar 50, the wheel 70 will be engaged by one of the curved ends 74 of the rail 73 while in its position of FIGS. 3 and 5 and will ride up said curved end or cam surface to its position of FIGS. 2 and 4, for swinging the lever arm 66 upwardly to cause the ears 68 to straddle the bars 57 and 58 for locking the posts 45 and 47 and the arms 46 and 48 in their positions of FIG. 2 to prevent the conduit section 28 from swinging from its upright position. When the carriage and parts supported thereby have traveled a short distance beyond the intermediate position of FIGS. 1 and 2, in either direction, the wheel 70 will ride off of the straight portion of the rail 73 and on to one of the curved ends 74 and thereafter completely out of engagement with the rail as said rail moves with the carriage 11 away from said intermediate position. When this occurs, the weight 67 will swing the arm 66 downwardly to its position of FIGS. 3 and 5 for disengaging the ears 68 from the bars 57 and 58.

As seen in FIG. 3, the carriage is moving toward the near end of the rail 9, FIG. 1, so that after the rail 73 disengages the wheel 70, the conduit section 34 will move toward the near end of the tank 8, FIG. 1, for exerting a pull on the section 28 through the swivel 31, to cause said conduit section 28 to swing toward the near end of the tank 8, or from right to left as seen in FIG. 3. This will cause the post 45 and arm 46 to swing in unison with the conduit section 28 for elevating the arm 53 and counterweight 54, so that when the carriage 11 has completed its travel toward the near end of the tank 8, FIG. 1, and begins to move back toward an intermediate position, the counterweight 54 will tend to lift and swing the conduit section 28 back toward an upright position and for elevating the end of the conduit section 34, located adjacent the swivel 31. As the conduit section 28 substantially reaches its upright position and so that the notches 49 have returned to positions embracing the collar 50, the rail 73 will move back into engagement with the wheel 70 for elevating the lever 66 to cause the ears 68 to embrace the bars 57 and 58 for returning the locking device to its operative position, locking the posts 45 and 47 in substantially upright positions and with the conduit section 28 held against swinging movement. The adjustable stops 59 and 60 limit upward swinging movement of the posts 45 and 47.

The airlift column 14 has a discharge spout 75 at its upper end through which the liquid from the tank 8 may be discharged into a gas liquid separator 76 as disclosed by U.S. Pat. No. 3,812,655. The separator 76 has a discharge spout which opens downwardly into a gutter 77 for carrying off the sludge laden liquid.

A locking device 78 for a gland nut 79 of the swivel 23, which is secured to the cylinder 24, additionally functions as a stop for the outermost ring 40.

Conduit 22 could connect with a vacuum source rather than a pressure source and various modifications and changes are contemplated and may be resorted to, without departing from the function or scope of the invention.

I claim as my invention:

1. A fluid conductor comprising a first swivel having one end communicating with a vacuum source, a first rigid conduit section having a first end connected to the other end of said swivel and disposed at substantially a right angle to the axis thereof, a second rigid conduit section disposed substantially parallel to said first conduit section, rigid conduit means including a second swivel interposed between and connecting a second end of said first conduit section to a first end of said second conduit section, a third rigid conduit section, a third swivel having one end connected to a second end of the second conduit section and an opposite end connected to a first end of said third conduit section, said third conduit section having a second inlet end connected to and movable with a reciprocally moving support, and counterbalancing means supported rotatably on said first swivel and releasably engaging said first rigid conduit section for returning said section to an upright position from an inclined position in either direction.

2. A fluid conductor comprising a first swivel having an inlet end communicating with a source of fluid under pressure, a first rigid conduit section having a first end connected to the outlet end of said first swivel and disposed at substantially a right angle to the axis thereof, a second rigid conduit section disposed substantially parallel to said first conduit section, rigid conduit means including a second swivel interposed between and connecting a second end of said first conduit section to a first end of said second conduit section, a third conduit section, a third swivel having one end connected to a second end of said second conduit section and an opposite end connected to a first end of said third conduit section, said third conduit section having a second outlet end connected to and movable with a reciprocally moving support, and counterbalancing means supported rotatively on said first swivel and releasably engaging said first rigid conduit section for returning said section to an upright position from an inclined position in either direction.

3. A fluid conductor as in claim 2 further comprising said first, second and third swivels having their axes disposed parallel to one another.

4. A fluid conductor as in claim 3, said counterbalancing means further including a pair of rings rotatively supported on said first swivel, an arm fixed to and supported by each ring, said arms having opposed portions embracing said first rigid conduit section in an upright position thereof, a counterweight connected to, supported by and spaced outwardly from each ring, the counterweight and arm of each ring being disposed on opposite sides of a vertical plane passing through the axis of said first swivel.

5. A fluid conductor as in claim 4, further comprising a stationary abutment disposed beneath said first swivel in a position coinciding with said vertical plane, a bar fixed to and depending from each of said rings, said bars straddling said abutment, and adjustable stops carried by said bars and engaging opposite sides of said abutment for limiting the rotation of said rings in response to the gravitational force imparted thereto by the counterweights.

6. A fluid conductor as in claim 5, further comprising a safety device embracing said bars during an intermediate portion of the reciprocating travel of said support for retaining said arms in engagement with said first conduit section.

7. A fluid conductor as in claim 6, said safety device further including a lever hingedly mounted for swinging movement about a horizontal axis, said lever being disposed beneath said first swivel, a weight supported by a free end of said lever, a wheel journaled beneath said lever near its hinged end, and a cam rail connected to and movable with said reciprocating support for engaging said wheel during an intermediate portion of the travel of said support in each direction for forcing the wheel in a direction to swing said level upwardly into a position to cause said safety device to straddle the bars.

* * * * *